US012697678B2

(12) United States Patent
Lin et al.

(10) Patent No.: US 12,697,678 B2
(45) Date of Patent: Aug. 4, 2026

(54) LASER CUTTING LIGHT SPOT CONTROL SYSTEM AND METHOD

(71) Applicant: JINAN BODOR CNC MACHINE CO., LTD., Jinan (CN)

(72) Inventors: Gaoling Lin, Jinan (CN); Mingjie Sun, Jinan (CN); Mandun Niu, Jinan (CN); Qinming Zhang, Jinan (CN); Chengshun Zhang, Jinan (CN); Peng Liu, Jinan (CN)

(73) Assignee: JINAN BODOR CNC MACHINE CO., LTD., Jinan (CN)

( * ) Notice: Subject to any disclaimer, the term of this patent is extended or adjusted under 35 U.S.C. 154(b) by 613 days.

(21) Appl. No.: 18/270,056

(22) PCT Filed: Oct. 31, 2022

(86) PCT No.: PCT/CN2022/128536
§ 371 (c)(1),
(2) Date: Jun. 28, 2023

(87) PCT Pub. No.: WO2023/072282
PCT Pub. Date: May 4, 2023

(65) Prior Publication Data
US 2024/0066626 A1 Feb. 29, 2024

(30) Foreign Application Priority Data
Oct. 29, 2021 (CN) .......................... 202111266446.5

(51) Int. Cl.
*B23K 26/042* (2014.01)
*B23K 26/38* (2014.01)
(Continued)

(52) U.S. Cl.
CPC ............ *B23K 26/042* (2015.10); *B23K 26/38* (2013.01); *B23K 2103/10* (2018.08); *B23K 2103/12* (2018.08)

(58) Field of Classification Search
CPC .. B23K 26/042; B23K 26/38; B23K 2103/10; B23K 2103/12; B23K 26/082; B23K 26/702
See application file for complete search history.

(56) References Cited

U.S. PATENT DOCUMENTS

2019/0047091 A1 2/2019 Huang et al.

FOREIGN PATENT DOCUMENTS

CN 102205469 A 10/2011
CN 108115289 A 6/2018
(Continued)

OTHER PUBLICATIONS

International Search Report of PCT Patent Application No. PCT/CN2022/128536 issued on Jan. 18, 2023.

*Primary Examiner* — Robert G Bachner

(57) ABSTRACT

A laser cutting light spot control system. The system includes an upper computer (1) and a laser cutting light spot control apparatus (2), wherein the upper computer is in communication connection with a main processor (3), and the upper computer is used for acquiring a light spot track parameter inputted by an operator, and transmitting the inputted light spot track parameter to the main processor; and the main processor fits the inputted light spot track parameters by means of a graphics processing module (4), so as to form light spot track graphics data, i.e., a cutting coordinate set. A storage module (5) is used for storing the light spot track parameter inputted by the operator, and the cutting coordinate set. The present application further relates to a laser cutting light spot control method.

34 Claims, 5 Drawing Sheets upper computer 1 — laser cutting light spot control apparatus 2

(51) Int. Cl.
B23K 103/10 (2006.01)
B23K 103/12 (2006.01)

(56) References Cited

FOREIGN PATENT DOCUMENTS

| CN | 108817695 A | 11/2018 |
| CN | 113182672 A | 7/2021 |

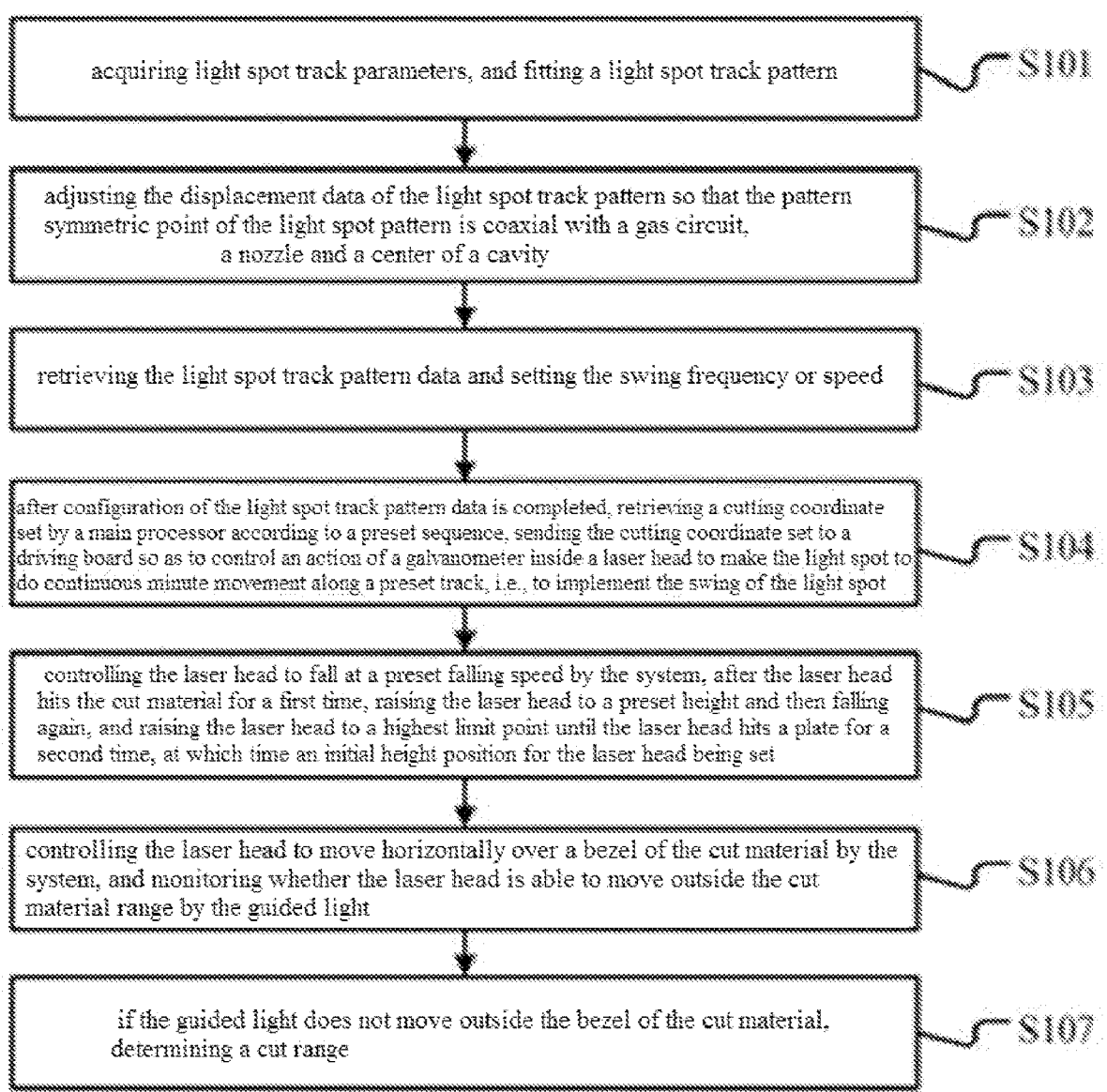

acquiring light spot track parameters, and fitting a light spot track pattern ⟶ S101 adjusting the displacement data of the light spot track pattern so that the pattern symmetric point of the light spot pattern is coaxial with a gas circuit, a nozzle and a center of a cavity ⟶ S102 retrieving the light spot track pattern data and setting the swing frequency or speed ⟶ S103 after configuration of the light spot track pattern data is completed, retrieving a cutting coordinate set by a main processor according to a preset sequence, sending the cutting coordinate set to a driving board so as to control an action of a galvanometer inside a laser head to make the light spot to do continuous minute movement along a preset track, i.e., to implement the swing of the light spot ⟶ S104 controlling the laser head to fall at a preset falling speed by the system, after the laser head hits the cut material for a first time, raising the laser head to a preset height and then falling again, and raising the laser head to a highest limit point until the laser head hits a plate for a second time, at which time an initial height position for the laser head being set ⟶ S105 controlling the laser head to move horizontally over a bezel of the cut material by the system, and monitoring whether the laser head is able to move outside the cut material range by the guided light ⟶ S106 if the guided light does not move outside the bezel of the cut material, determining a cut range ⟶ S107

Fig. 4

LASER CUTTING LIGHT SPOT CONTROL SYSTEM AND METHOD

The present application claims priority to Chinese Patent Application No. 202111266446.5, filed on Oct. 29, 2021, entitled "Laser Cutting Light Spot Control System and Method," the entire contents of which are incorporated herein by reference.

TECHNICAL FIELD

The present invention relates to the technical field of laser cutting, and in particular to a laser cutting light spot control system and method.

BACKGROUND

Laser cutting achieves cutting of a metal plate by irradiating the metal plate with a focused, high-power-density laser beam to rapidly melt, vaporize, ablate the metal plate or to enable the metal plate to reach the ignition point while blowing away the molten material with a high-velocity gas stream coaxial with the beam. Compared with plasma cutting, flame cutting, wire cutting, etc., laser cutting has the advantages such as a small heat affected zone, a fast cutting speed, and good cutting quality, and is rapidly and widely used in the cutting process of metal plates.

During laser machining, the energy of the light spot and the spatial distribution of the energy have a large influence on the laser processing capability and speed, in conventional laser machining techniques, since the laser heat gradually decays away from the laser focus, especially in thick plate processing, the laser beam is stationary with respect to the machine body of the cutting head and does not produce a moving track with respect to the machine body of the laser head, so that the highest energy point of the laser cannot be well transferred to the area to be machined of the plate material, which easily results in problems of low energy utilization of the laser beam, low cutting efficiency, sticking of the machined piece or deterioration of the quality of the cut surface.

SUMMARY

The present application provides a laser cutting light spot control system, and the system forms light spot track pattern data according to preset parameters, and improves energy utilization rate of the laser beam, and improves cutting efficiency and quality.

The system specifically includes: an upper computer and a laser cutting light spot control apparatus disposed on a cutting device;

the laser cutting light spot control apparatus includes: a graphic processing module, a storage module and a main processor;

the upper computer is communicatively connected with the main processor, the upper computer is configured to acquire light spot track parameters input by a user, and transmit the input light spot track parameters to the main processor; and the main processor performs coordinate point fitting of the input light spot track parameters through the graphic processing module to form a minimum component unit of a light spot pattern, and forms final light spot track pattern data and a cutting coordinate set based on the minimum component unit through rotation, translation, replication, stretching operations, and stores into the storage module.

It is further noted that the main processor is further configured to retrieve a cutting coordinate set from the storage module in a preset cutting sequence to perform a cutting process;

the preset cutting sequence includes:

scanning the light spot track pattern data in a clockwise direction;

or, scanning the light spot track pattern data in a counterclockwise direction;

or, retrieving the light spot track pattern data at preset time intervals to implement periodic scanning of the light spot track pattern data;

or, according to the sparsity of coordinate points, performing interval extraction scanning on the light spot track pattern data.

It is further noted that the laser cutting light spot control apparatus includes: a memory;

the memory stores therein light spot track parameters;

the main processor receives the light spot track parameters transmitted by the upper computer, compares the received light spot track parameters with the light spot track parameters stored in the memory, and judges whether they are identical or not;

if they are identical, the received light spot track parameters are not written into the memory, and the light spot track parameters stored in the memory are retrieved and configured into light spot track pattern data;

if they are not identical, the received light spot track parameters are written into the memory, and the received light spot track parameters are configured into light spot track pattern data; and if the upper computer sends a start-up control command to the main processor and the light spot track parameters are not attached, the main processor retrieves previous light spot track parameters from the memory and configures the previous light spot track parameters into light spot track pattern data to perform a cutting operation.

It is further noted that the laser cutting light spot control apparatus further includes: an auxiliary chip; and the auxiliary chip is configured to monitor operation data of the laser cutting light spot control system, and when fault data occurs in the laser cutting light spot control system, an alarm prompt is performed.

The present invention also provides a laser cutting light spot control method, and the method includes:

acquiring light spot track parameters;

performing coordinate point fitting, by a graphic processing module, on the input light spot track parameters to form a minimum component unit of a light spot pattern, and then forming final light spot track pattern data by one or more operations of rotation, translation, replication, and stretching based on the minimum component unit, and performing storage; and executing a cutting process by retrieving a cutting coordinate set from a storage module in a preset cutting sequence.

It is further noted that, in the method, the graphic processing module performs coordinate point fitting according to the light spot track parameters and light spot track pattern data input by a user, calculates the minimum component unit forming the light spot pattern, and then forms first light spot track pattern data by rotation, translation, replication, stretching operations based on the minimum component unit;

the first light spot track pattern data includes, but is not limited to: an elliptical shape, or a figure-8 shape, or a semicircular shape, or an O-shape, or a ∞-shape; and when second light spot track pattern data is formed after the first light spot track pattern data is configured to be performed, an offset between a pattern center symmetric point corresponding to the first light spot track pattern data and a pattern center symmetric point corresponding to the second light spot track pattern data is displacement data of a pattern center symmetric point.

It is further noted that the method further includes:

acquiring light spot track parameters;

adjusting the displacement data of the pattern symmetric point therein so that the pattern symmetric point of the light spot pattern is coaxial with an air path, a nozzle and a center of a cavity;

retrieving the light spot track pattern data and setting a swing frequency or speed;

after configuration of the light spot track pattern data is completed, retrieving a cutting coordinate set by a main processor according to a preset sequence, sending the cutting coordinate set to a driving board so as to control an action of a galvanometer motor inside a laser head to make the light spot to do continuous minute movement along a preset track, i.e., to implement the swing of the light spot, and generating a light spot track pattern to be projected on a cut material by guided light;

controlling the laser head to fall at a preset falling speed by the system, after the laser head hits the cut material for a first time, raising to a preset height and then falling again, and raising to a highest limit point until the laser head hits a plate for a second time, at which time an initial height position for the laser head being set;

controlling the laser head to move horizontally over a bezel of the cut material by the system, and monitoring whether the laser head is able to move outside the cut material range by the guided light; and if the guided light does not move outside the bezel of the cut material, determining a cut range.

It is further noted that the cutting material mainly includes a stainless steel plate, a copper plate, an aluminum plate and a carbon steel plate; according to the thickness, it can be classified as a thin plate from 1 mm to 6 mm, a medium plate from 7 mm to 15 mm, and a thick plate from 16 mm or above;

when cutting a stainless steel medium plate or thick plate, a light spot track diameter is 40-160 pixels, a swing frequency is 80-300 Hz, a focus is a negative focus, and the pressure is 5-25 bar when a cutting auxiliary gas is nitrogen or air; after adopting the present method, the cutting speed can be increased by 30-80% compared to laser cutting with the same parameters but the light spot is not adjustable;

when cutting a carbon steel medium plate or thick plate, a light spot track diameter is 10-80 pixels, a swing frequency is 100-200 Hz, a focus is a positive focus, and the pressure is 0.4-2.8 bar when the cutting auxiliary gas is oxygen; after adopting the present method, the cutting speed can be increased by 10-45% compared to laser cutting with the same parameters but the light spot is not adjustable; and when cutting a medium or thick plate of copper or aluminum, a light spot track diameter is 40-90 pixels, a swing frequency is 100-300 Hz, a focus is a negative focus, and the pressure is 5-25 bar when the cutting auxiliary gas is nitrogen or air; after adopting the present method, the cutting speed can be increased by 20-300% compared to laser cutting with the same parameters but the light spot is not adjustable.

It is further noted that the method further includes, after the laser cutting light spot control apparatus is powered on, outputting first working state information and second working state information by the main processor;

outputting the first working state information to an auxiliary chip, and detecting the first working state information by the auxiliary chip in real time;

when the auxiliary chip detects that the first working state information is abnormal, sending out alarm information to the system; and when the auxiliary chip crashes, starting a watchdog set inside the auxiliary chip to perform reset restarting on the auxiliary chip to continue to detect the state of the main processor; monitoring the second working state information as well as the auxiliary chip state information by a controller in real time, and when detecting that the second working state information or the auxiliary chip state information is abnormal, turning off lighting of the laser immediately by the controller of the cutting device, and simultaneously giving an alarm;

monitoring the state of the driving board in real time by the auxiliary chip, when the driving board fails or reports an error, outputting a driving board failure signal by the auxiliary chip; and detecting the temperature of the driving board by the auxiliary chip through a temperature sensor, and sending out an alarm signal indicating that the temperature exceeds a threshold when the temperature exceeds the threshold.

As can be seen from the above technical solutions, the present invention has the following advantages:

The present invention enables fast cutting of medium thickness plates of stainless steel, copper, aluminum and carbon steel by using variable light spot track laser cutting, which enables cutting of thicker plates compared to non-variable light spot track laser heads. After the cutting light spot track parameters are selected, i.e., the light spot track shape is selected, the light spot size and pattern satisfy the cutting requirements, and the cutting quality is ensured.

In the present application, the slit and the molten pool are made large by the continuous minute movement of the light spot, and the outflow of the plate molten material is facilitated, and the perforation failure rate is greatly reduced; and the beam focus position is also correspondingly lowered during the cutting process, ensuring the uniformity of the laser energy in the plate; in addition, the cutting gas pressure is reduced in value compared to the situation that the light spot is fixed, so that the method can reduce the cooling effect of the cutting gas under the condition of accelerating the discharge of molten metal, improve the heat utilization rate of laser cutting, and realize faster and thicker plate cutting.

BRIEF DESCRIPTION OF THE DRAWINGS

To illustrate the technical solution of the present invention more clearly, the accompanying drawings required for use in the description will be briefly described below, and it is obvious that the accompanying drawings in the following description are only some embodiments of the present invention, and other drawings can be obtained from these drawings for those of ordinary skill in the art without making inventive labor.

FIG. 4 is a flowchart of a laser cutting light spot control method; and

> 1—upper computer, 2—laser cutting light spot control apparatus, 3—main processor, 4—graphic processing module, 5—storage module, 6—auxiliary chip, 7—driving board.

DETAILED DESCRIPTION

The technical solutions in the embodiments of the present invention will be clearly and completely described below in conjunction with the accompanying drawings in the embodiments of the present invention, it is obvious that the described embodiments are only a part of the embodiments of the present invention, rather than all of the embodiments. Based on the embodiments in the present invention, all other embodiments obtained by those of ordinary skill in the art without making inventive labor, belong to the scope of protection of the present invention.

Units and algorithm steps of examples described in embodiments disclosed in the laser cutting light spot control system provided by the present invention can be implemented in electronic hardware, computer software, or a combination of both. To clearly illustrate the interchangeability of hardware and software, components and steps of various examples have been described in the foregoing description generally in terms of their functionality. Whether such functionality is implemented as hardware or software depends upon the particular application and design constraints of the solution. Those skilled may implement the described functionality in varying ways for each particular application, but such implementation should not be interpreted as causing a departure from the scope of the present invention.

In the figures of the laser cutting light spot control system provided by the present invention, the block diagrams shown are only functional entities and do not necessarily correspond to physically separate entities. That is, these functional entities may be implemented in software, or in one or more hardware modules or integrated circuits, or in different networks and/or processor devices and/or microcontroller devices.

While the present invention provides a laser cutting light spot control system, it should be understood that the disclosed system, apparatus, and method may be implemented in other ways. For example, the apparatus embodiments described above are merely illustrative, e.g., the division of the units is merely a logical function division, and other divisions may be actually implemented, e.g., multiple units or components may be combined or integrated into another system, or some features may be omitted or not implemented. In addition, the couplings or direct couplings or communication connections shown or discussed with each other may be indirect couplings or communication connections through some interfaces, devices, or units, and may be electrical, mechanical connections, or other types of connections.

Figure 1:
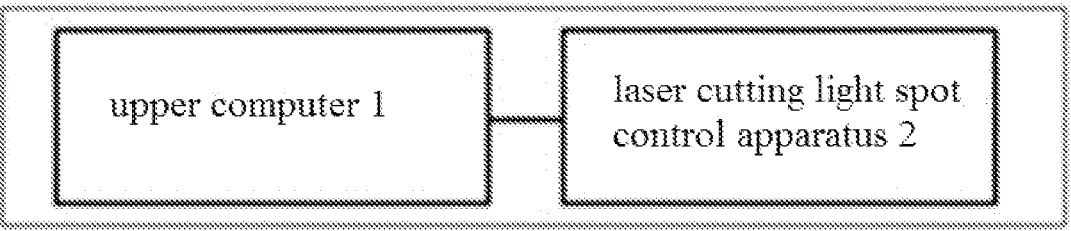
FIG. 1 is a schematic diagram of a laser cutting light spot control system according to the present invention.
Figure 2:
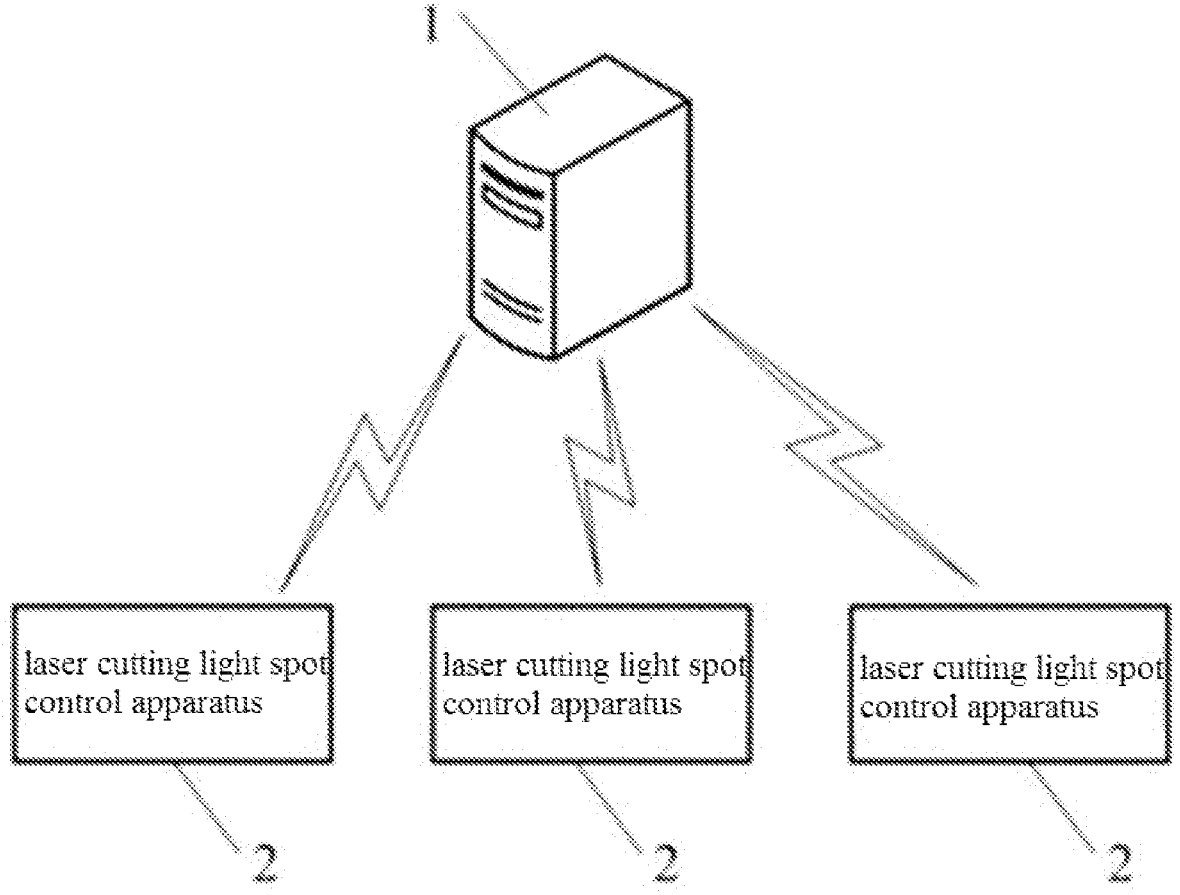
FIG. 2 is a schematic diagram of an embodiment of a laser cutting light spot control system.
Figure 3:
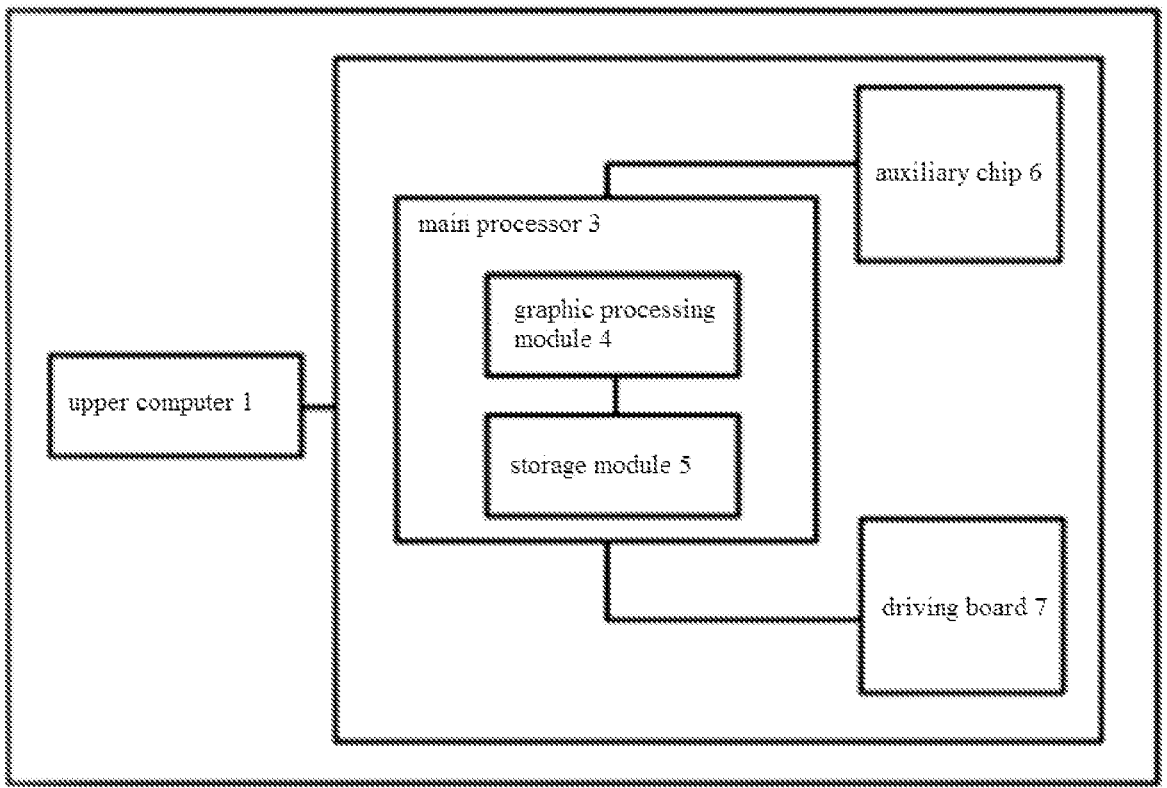
FIG. 3 is a schematic diagram of communication between an upper computer and a laser cutting light spot control apparatus.

As shown in FIGS. 1 to 3, the present invention provides a laser cutting light spot control system, including: an upper computer 1 and a laser cutting light spot control apparatus 2 disposed on a cutting device; here, the upper computer 1 is correspondingly in communication control with one cutting device, and according to actual needs, the upper computer 1 may in communication control with a plurality of cutting devices to achieve synchronous or asynchronous cutting, thus improving cutting efficiency.

The cutting device to which the present invention relates is a device for cutting plates or related materials, mainly by means of laser cutting.

A laser cutting light spot control apparatus 2 is provided on the cutting device, which in the present invention includes: a graphic processing module 4, a storage module 5 and a main processor 3;

> of course, as an embodiment of the present invention, the laser cutting light spot control apparatus 2 may also relate to a communication unit, an input unit, a sensing unit, an output unit, a memory, an interface unit and a power supply unit, etc. It should be understood, however, that not all illustrated components are required to be implemented. More or fewer components may alternatively be implemented.

The upper computer 1 is communicatively connected with the main processor 3, the upper computer 1 is configured to acquire the light spot track parameters input by the user, and transmit the input light spot track parameters to the main processor 3; the main processor 3 forms light spot track pattern data (i.e., a cutting coordinate set) after fitting the input light spot track parameters through the graphic processing module 4; the storage module 5 is configured to store the user-input light spot track parameters and the cutting coordinate set.

The graphic processing module 4 performs coordinate point fitting according to the light spot track parameters input by the user, the set of fitted coordinate points forms a minimum component unit of a light spot pattern, and forms final light spot track pattern data based on the minimum component unit through one or more operations of rotation, translation, replication, and stretching. The light spot track pattern to which the light spot track parameters relates may include an elliptical shape, or a figure-8 shape, or a semicircular shape, or an O-shape, or an ∞-shape, or the like. The light spot track pattern data also relates to parameters such as swing frequency, beam scanning speed, cutting speed and the like. The swing frequency is the vibration frequency of the galvanometer, the resulting beam moves for one cycle when the galvanometer vibrates for one cycle.

The upper computer 1 and the main processor 3 may be communicatively connected via a bus, and the graphic processing module 4 performs a graphics interpolation operation on the received data parameters and places the resulting set of data points into the storage module 5. The storage module 5 may be a storage or the like. The graphic processing module 4 may be a software program that processes the light spot track parameters. The graphic processing module 4 is pre-installed into the cutting device and is executed by the main processor 3 as hardware. That is, the main processor 3 retrieves a cutting coordinate set according to a preset sequence, transmits to the driving board and controls the swing of the galvanometer motor, thereby causing the beam from the laser head to perform laser cutting according to the light spot track pattern.

The graph calculation manner can sequentially calculate all the coordinate point data through a mathematical calculation formula. The generated light spot track pattern data is an elliptical shape, or a figure-8 shape, or a semicircular shape, or an O-shape, or a ∞-shape; and is not limited to the above-mentioned figures, other shapes of figures may also be provided.

The light spot track pattern data includes parameters such as the light spot track pattern and the corresponding size of the light spot track pattern.

In a specific embodiment, a ¼ elliptical arc is made with reference to the central symmetric point (x0, y0) of the pattern, then a complete elliptical coordinate point set is obtained by using the symmetry relationship, and a plurality of ¼ circular arcs are arranged to form a light spot track pattern. The light spot track pattern may have a "figure-8" shape, or a semicircular shape, or an "O" shape, or an "∞" shape, or the like.

The displacement data of the pattern central symmetric point is a parameter of the movement of the pattern central symmetric point (x0, y0) after the current light spot track pattern operation is completed, such as after the current light spot track pattern fitting, the pattern is moved as a whole by 0.5 mm, and then the light spot track pattern cutting operation is performed.

The present embodiment can realize the cutting coordinate set overall shift by setting the displacement data of the graph central symmetric point (x0, y0), the lateral or longitudinal stretching of the pattern can be controlled by modifying the light spot track parameters, the cutting coordinate set stored in the storage module 5 is extracted according to the control command issued from the upper computer 1 and the set parameters, and the cutting process is performed.

The above relates to the generation and configuration of the light spot track pattern. In the present invention, in order to set the operation mode of each light spot track pattern, the main processor 3 is further configured to execute a cutting process by retrieving a cutting coordinate set from the storage module 5 in a preset cutting sequence;

the preset cutting sequence includes:

the light spot track pattern data is scanned in a clockwise direction; that is, during the cutting process, the main processor 3 performs the cutting process in a clockwise direction, for example, the light spot track pattern is elliptical, and the light spot track pattern data is scanned in a clockwise direction during the cutting process. It is of course also possible to scan the light spot track pattern data in a counterclockwise direction.

As an embodiment of the present invention, in the cutting process, the cutting is performed according to a cutting need instead of continuously extracting the light spot track pattern data. The light spot track pattern data can be retrieved at preset time intervals, thus realizing periodic scanning of the light spot track pattern data; after performing the light spot track pattern data once, a preset time period is spaced, the light spot track pattern data is extracted once more for cutting, and so on.

Or, according to the sparsity of the coordinate points, interval extraction scanning is performed on the light spot track pattern data. For example, the light spot track pattern data is arranged according to a sequence, for example, only the light spot track pattern data of the even sequences is extracted, the output of light spot track pattern data is controlled, and the cutting process is performed.

The present invention is not limited to the above-described cutting sequence, and other cutting sequences may be provided to perform cutting according to actual needs.

By the above embodiments, the configured generation of the light spot track pattern is realized, and the cutting sequence of the light spot track pattern is further configured, the system can store the previously generated light spot track pattern data into the storage module 5, so that when cutting is performed subsequently, the previously existing light spot track pattern data can be directly extracted, and the cutting efficiency can be improved.

Further, in the present invention, the laser cutting light spot control apparatus 2 includes: a memory; the memory may employ an AT24C02 chip.

The memory is a maintenance-free component after installation on the laser cutting light spot control apparatus 2, in order to prolong the service life of the memory and to reduce the number of times of writing, the main processor 3 receives the light spot track parameters transmitted by the upper computer 1, compares the received light spot track parameters with those stored in the memory, and judges whether or not they are identical;

if they are identical, the received light spot track parameters are not written into the memory, and the light spot track parameters stored in the memory are retrieved and configured into light spot track pattern data; and if they are not identical, the received light spot track parameters are written into the memory, and the received light spot track parameters are configured into light spot track pattern data.

If the upper computer 1 sends a start control command directly to the main processor 3, and the light spot track parameters are not attached, if then the cutting head is not directed towards the plate material, but points to the side or another direction, the cutting head can cause injury to surrounding personnel or equipment, in this case, the main processor 3 retrieves the light spot track parameters used by the operator last time from the memory, and configures the light spot track parameters into light spot track pattern data to perform the cutting operation in which the cutting head is oriented toward the workpiece, thus preventing the laser from being at an unpredictable emission angle at the time of power-on to endanger the safety of personnel and device, and ensuring the safety of operation.

As an embodiment of the present invention, the laser cutting light spot control apparatus 2 further includes: an auxiliary chip; the auxiliary chip is configured to monitor operation data of the laser cutting light spot control system, and when fault data of the laser cutting light spot control system is monitored, an alarm prompt is performed.

Both the main processor 3 and the auxiliary chip may employ ARM chips. The main processor 3 is communicatively connected with the upper computer 1, acquires the light spot track parameters input by the operator, and forms light spot track pattern data after fitting the input light spot track parameters through the graphic processing module 4; the main processor 3 retrieves the cutting coordinate set from the storage module 5 and performs the cutting process.

The auxiliary chip is configured to monitor the operation state of the main processor 3, and the auxiliary chip can give an alarm when the main processor 3 fails. The auxiliary chip can also monitor the operation temperature in the cutting device, the state value of the driving board and the like, and display the operation state of the cutting device, and the upper computer 1 according to the present invention can acquire the user's control command and the cutting preset parameters and monitor the cutting process data and the like.

The main processor 3 to which the present invention relates may also be implemented by using at least one of an application specific integrated circuit (ASIC), a digital signal processor (DSP), a digital signal processing device (DSPD), a programmable logic device (PLD), a field programmable gate array (FPGA), a processor, a microcontroller, a microprocessor, an electronic unit designed to perform the functions described herein, and in some cases, such implementations may be implemented in a controller. For a software implementation, an implementation such as a procedure or function may be implemented with a separate software module allowing at least one function or operation to be performed. The software code may be implemented by a software application (or program) written in any suitable programming language, which may be stored in the memory and executed by the controller.

Based on the laser cutting light spot control system, the present invention also provides a laser cutting light spot control method, as shown in FIG. 4, the method includes:

S101, light spot track parameters are acquired, a light spot track pattern is fitted;

the light spot track parameters include a light spot track pattern, a light spot diameter, a swing frequency or swing speed, displacement data, etc.

S102, the displacement data of the light spot track pattern is adjusted so that the pattern symmetric point of the light spot pattern is coaxial with a gas circuit, a nozzle and a center of a cavity;

S103, the light spot track pattern data is retrieved and the swing frequency or speed is set;

S104, after configuration of the light spot track pattern data is completed, a cutting coordinate set is retrieved by a main processor according to a preset sequence, the cutting coordinate set is sent to a driving board 7 so as to control an action of a galvanometer motor inside a laser head to make the light spot to do continuous minute movement along a preset track, i.e., to implement the swing of the light spot, and a light spot track pattern is generated to be projected on a cut material by guided light;

S105, the laser head is controlled to fall at a preset falling speed by the controller of the cutting device, after the laser head hits the cut material for a first time, the laser head is raised to a preset height and then falls again, and the laser head is raised to a highest limit point until the laser head hits a plate for a second time, at which time an initial height position for the laser head is set;

S106, the laser head is controlled to move horizontally over a bezel of the cut material by the controller of the cutting device, and whether the laser head is able to move outside the cut material range is monitored by the guided light; and S107, if the guided light does not move outside the bezel of the cut material, a cut range is determined.

For example, a ¼ elliptical arc is made with reference to the central symmetric point (x0, y0) of the pattern, then a complete elliptical coordinate point set is obtained by using the symmetry relationship, and a plurality of ¼ circular arcs are arranged to form a light spot track pattern. The light spot track pattern may have a figure-8 shape, or a semicircular shape, or an O shape, or an ∞ shape, or the like.

The cutting device of the present invention has a separate controller for controlling the operation of the cutting head and the operation of the cutting device. The controller of the cutting device may be communicatively connected to the main processor for data interaction.

In the method of the present invention, the plurality of circular arcs can be arranged and combined and coordinates can be rotated to form light spot track pattern data; that is, in addition to combining the circular arcs into the light spot track pattern data in a symmetrical manner, the plurality of circular arcs may be combined based on a relative positional relationship to form the light spot track pattern.

It is also possible to adopt a circular arc as the light spot track pattern data; that is, it is not limited to an elliptical shape, or a figure-8 shape, or a semicircular shape, or an O shape, or an ∞ shape.

As in the method of the present invention, in order to perform real-time monitoring of the operation process of the laser cutting light spot control system, and to ensure stable operation of the system, the laser cutting light spot control apparatus further includes: an auxiliary chip 6; the auxiliary chip 6 is configured to monitor the operation data of the laser cutting light spot control system, and when the system fails, an alarm prompt is performed.

Figure 5:
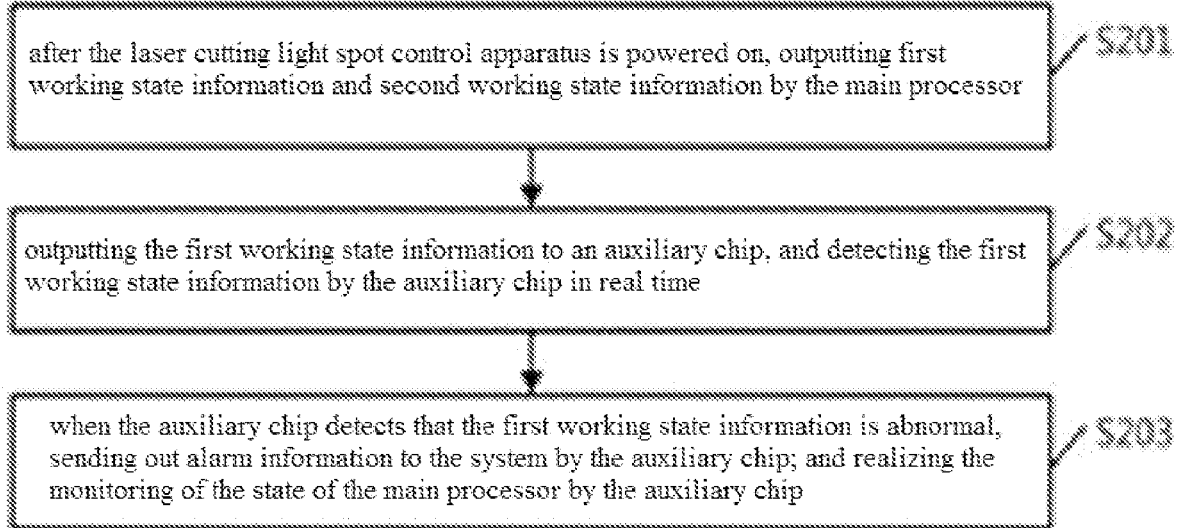
FIG. 5 is a flowchart of an embodiment of the laser cutting light spot control method.

Specifically, as shown in FIG. 5:

S201, after the laser cutting light spot control apparatus is powered on, first working state information and second working state information is output by the main processor; the working state information may include, but is not limited to, frequency information, level information, communication signals, and the like.

S202, the first working state information is output to an auxiliary chip 6, and the first working state information is detected by the auxiliary chip 6 in real time; and S203, when the auxiliary chip 6 detects that the first working state information is abnormal, the auxiliary chip 6 sends out alarm information to the system; and the monitoring of the state of the main processor by the auxiliary chip 6 is realized.

The above steps S201 to S203 are to turn on a monitoring process after the laser cutting light spot control system is powered on, and the monitoring process accompanies the entire cutting process. The laser cutting light spot control system may be a set of cutting device.

When the auxiliary chip 6 crashes, a watchdog set inside the auxiliary chip 6 is started to perform reset restarting on the auxiliary chip 6 to continue to detect the state of the main processor.

The watchdog in the auxiliary chip 6, essentially a timer circuit, is provided with an input port and an output port, the output port being connected to a reset terminal of the auxiliary chip 6. The function of the watchdog is to periodically look at the operation of the auxiliary chip 6 and issue a restart signal to the auxiliary chip 6 once the auxiliary chip 6 has an error. Watchdog commands have the highest priority among interrupts of the program.

The controller of the cutting device monitors the second working state information as well as the state information of the auxiliary chip 6 in real time, when it is detected that the second working state information or the state information of the auxiliary chip 6 is abnormal, the controller of the cutting device immediately turns off lighting of the laser, and simultaneously gives an alarm;

In order to realize the detection of each electrical module of the system, for the invention, the auxiliary chip 6 monitors the state of the driving board 7 of the cutting device in real time, when the driving board 7 fails or reports an error, a driving board 7 failure signal is output by the auxiliary chip 6;

The drive plate 7 is configured to receive the light spot track pattern data from the main processor and to control an action of the galvanometer motor inside a laser head to make the light spot to do continuous minute movement along a track to form the light spot track pattern. The auxiliary chip 6 is connected to the driving board 7, and can acquire the state of each electric component, and if a fault or an abnormality occurs, can give an alarm in time.

The auxiliary chip 6 can also detect the temperature of the driving board 7 through a temperature sensor, and when the temperature exceeds the threshold, send out an alarm signal which indicates that the temperature exceeds the threshold.

This ensures stable operation of the cutting device, in-time monitoring and alarming can be performed when anomalies or faults occur, avoiding that the anomalies or faults are enlarged to affect the cutting quality.

The process of the present invention for cutting using the above laser cutting light spot control method may include the following ways, specifically, light spot track parameters are acquired;

the light spot track parameters may relate to parameters such as the material of the cut material, the thickness, the cutting height, the cutting focus, the cutting speed, the cutting gas pressure parameters, the cutting nozzle, the light spot track pattern, the light spot diameter, the swing frequency or speed.

The displacement data of the light spot track pattern symmetric point is adjusted so that the pattern symmetric point of the light spot pattern is coaxial with an air path, a nozzle and a center of a cavity;

the light spot track pattern data is retrieved and a swing frequency or speed is set, and a beam focus in a moving state and a beam focus in a non-moving state during cutting are set;

after the configuration of the light spot track pattern data is completed, a light spot track pattern generated by guided light is projected on the cut material;

the laser head is controlled to fall at a preset falling speed by the system, after the laser head hits the cut material for a first time, the laser head is raised to a preset height and then falls again, and is raised to a highest limit point until the laser head hits a plate for a second time, at which time an initial height position for the laser head is set;

the laser head is controlled to move horizontally over a bezel of the cut material by the controller of the cutting device, and whether the laser head is able to move outside the cut material range is monitored by the guided light; and if the guided light does not move outside the bezel of the cut material, a cut range is determined. The system controls the operation of the laser head and the laser beam cuts with a preset light spot track pattern.

The cutting material mainly includes a stainless steel plate, a copper plate, an aluminum plate and a carbon steel plate; according to the thickness, it can be classified as a thin plate from 1 mm to 6 mm, a medium plate from 7 mm to 15 mm, and a thick plate from 16 mm or above.

For various plates of different thicknesses, the following settings may be used: when cutting a stainless steel medium plate or thick plate, a light spot track diameter is 40-160 pixels, a swing frequency is 80-300 Hz, a focus is a negative focus, and the pressure is 5-25 bar when a cutting auxiliary gas is nitrogen or air; after adopting the present method, the cutting speed for the stainless steel medium and thick plates can be increased by 30-80% compared to laser cutting with the same parameters but the light spot is not adjustable.

When cutting a carbon steel medium plate or thick plate, a light spot track diameter is 10-80 pixels, a swing frequency is 100-200 Hz, a focus is a positive focus, and the pressure is 0.4-2.8 bar when the cutting auxiliary gas is oxygen; after adopting the present method, the cutting speed for the stainless steel medium and thick plates can be increased by 10-45% compared to laser cutting with the same parameters but the light spot is not adjustable.

When cutting a medium or thick plate of copper or aluminum, a light spot track diameter is 40-90 pixels, a swing frequency is 100-300 Hz, a focus is a negative focus, and the pressure is 5-25 bar when the cutting auxiliary gas is nitrogen or air; after adopting the present method, the cutting speed can be increased by 20-300% compared to laser cutting with the same parameters but the light spot is not adjustable.

In addition, for stainless steel thin plates, carbon steel thin plates and middle plates, copper or aluminum thin plates, the light spot track adjustable function can be selectively turned on or off at the time of cutting depending on the cutting requirements.

The effect of this solution is: by the continuous minute movement of the light spot, the actual output beam is at an angle to the vertical direction, the slit and the molten pool of the plate are made large, and the outflow of the plate molten material is facilitated, and the perforation failure rate is greatly reduced during cutting. In addition, the focus position of the light beam in the cutting process is correspond-ingly reduced to ensure the uniformity of the laser energy in the plate, so that the cutting speed is faster. The increase of the molten pool of the cutting plate provides good conditions for cutting thicker plates. In addition, the cutting gas pres-sure is reduced compared with that when the light spot is fixed, therefore, the method can weaken the cooling effect of the cutting gas and improve the heat utilization rate of laser cutting under the condition of accelerating the discharge of molten metal. In addition, because the light spot is in a swing state, and the light swings according to its pattern track, the heating uniformity of the plate is better than that of the point-shaped light spot cutting mode. The uniform heating mode, reasonable slot size and corresponding stable air pressure can improve the slag hanging problem at the bottom of the cutting plate. Moreover, compared with the laser cutting with the variable non-spot track, it can realize faster and thicker plates cutting.

The terms "first", "second", "third", "fourth" and the like in the description and claims of the present invention and the figures above, if present, are used to distinguish similar objects and need not be used to describe a particular order or priority. It should be understood that the data thus used can be interchanged where appropriate so that the embodi-ments of the invention described herein can be implemented in an order other than those illustrated or described herein. Furthermore, the terms "including" and "having" and any variations thereof are intended to cover non-exclusive inclu-sion.

The previous description of the disclosed embodiments is provided to enable any person skilled in the art to make or use the present invention. Various modifications to these embodiments will be readily apparent to those skilled in the art, and the generic principles defined herein may be imple-mented in other embodiments without departing from the spirit or scope of the invention. Thus, the present invention is not intended to be limited to the embodiments shown herein but is to be accorded the widest scope consistent with the principles and novel features disclosed herein.

What is claimed is:

1. A laser cutting light spot control system, characterized by comprising: an upper computer and a laser cutting light spot control apparatus disposed on a cutting device;

the laser cutting light spot control apparatus comprises: a graphic processing module, a storage module and a main processor;

the upper computer is communicatively connected with the main processor, the upper computer is configured to acquire light spot track parameters input by a user, and transmit the input light spot track parameters to the main processor; and the main processor performs coordinate point fitting of the input light spot track parameters through the graphic processing module to form a minimum component unit of a light spot pattern, and forms final light spot track pattern data and a cutting coordinate set based on the minimum component unit through rotation, translation, replication, stretching operations, and stores into the storage module.

2. The laser cutting light spot control system according to claim 1, characterized in that, the main processor is further configured to retrieve a cutting coordinate set from the storage module in a preset cutting sequence to perform a cutting process;

the preset cutting sequence comprises:

scanning the light spot track pattern data in a clockwise direction;

or, scanning the light spot track pattern data in a counterclockwise direction;

or, retrieving the light spot track pattern data at preset time intervals to implement periodic scanning of the light spot track pattern data;

or, according to the sparsity of coordinate points, performing interval extraction scanning on the light spot track pattern data.

3. The laser cutting light spot control system according to claim 1, characterized in that, the laser cutting light spot control apparatus comprises: a memory;

the memory stores therein light spot track parameters;

the main processor receives the light spot track parameters transmitted by the upper computer, compares the received light spot track parameters with the light spot track parameters stored in the memory, and judges whether they are identical or not;

if they are identical, the received light spot track parameters are not written into the memory, and the light spot track parameters stored in the memory are retrieved and configured into light spot track pattern data; and if they are not identical, the received light spot track parameters are written into the memory, and the received light spot track parameters are configured into light spot track pattern data.

4. The laser cutting light spot control system according to claim 3, characterized in that, when the upper computer sends a start-up control command to the main processor and the light spot track parameters are not attached, the main processor retrieves previous light spot track parameters from the memory and configures the previous light spot track parameters into light spot track pattern data to perform a cutting operation.

5. The laser cutting light spot control system according to claim 1, characterized in that, the laser cutting light spot control apparatus further comprises: an auxiliary chip; and the auxiliary chip is configured to monitor operation data of the laser cutting light spot control system, and when fault data of the laser cutting light spot control system is monitored, an alarm prompt is performed.

6. A laser cutting light spot control method, characterized in that, the method adopts the laser cutting light spot control system according to claim 2;

the method comprises:

acquiring light spot track parameters;

performing coordinate point fitting, by a graphic processing module, on the input light spot track parameters to form a minimum component unit of a light spot pattern, and then forming final light spot track pattern data by rotation, translation, replication, stretching operations based on the minimum component unit, and performing storage; and executing a cutting process by retrieving a cutting coordinate set from a storage module in a preset cutting sequence.

7. The laser cutting light spot control method according to claim 6, characterized in that, in the method, the graphic processing module performs coordinate point fitting according to the light spot track pattern data input by a user, calculates the minimum component unit forming the light spot pattern, and then forms first light spot track pattern data by rotation, translation, replication, stretching operations based on the minimum component unit;

the first light spot track pattern data comprises: an elliptical shape, or a figure-8 shape, or a semicircular shape, or an O-shape, or a ∞-shape; and when second light spot track pattern data is formed after the first light spot track pattern data is configured to be performed, an offset between a pattern center symmetric point corresponding to the first light spot track pattern data and a pattern center symmetric point corresponding to the second light spot track pattern data is displacement data of a pattern center symmetric point.

8. The laser cutting light spot control method according to claim 6, characterized by further comprising:

adjusting the displacement data of the pattern symmetric point therein so that the pattern symmetric point of the light spot pattern is coaxial with an air path, a nozzle and a center of a cavity;

retrieving the light spot track pattern data and setting a swing frequency or speed; and after configuration of the light spot track pattern data is completed, retrieving a cutting coordinate set by a main processor according to a preset sequence, sending the cutting coordinate set to a driving board so as to control a galvanometer motor inside a laser head to make the light spot to do continuous minute movement along a preset track, i.e., to implement the swing of the light spot, and generating a light spot track pattern to be projected on a cut material by guided light.

9. The laser cutting light spot control method according to claim 6, characterized in that the method further comprises:

controlling the laser head to fall at a preset falling speed, after the laser head hits the cut material for a first time, raising to a preset height and then falling again, and raising to a highest limit point until the laser head hits a plate for a second time, at which time an initial height position for the laser head being set;

controlling the laser head to move horizontally over a bezel of the cut material, and monitoring whether the laser head is able to move outside the cut material range by the guided light; and if the guided light does not move outside the bezel of the cut material, determining a cut range.

10. The laser cutting light spot control method according to claim 6, characterized in that, when cutting a stainless steel medium plate or thick plate, a light spot track diameter is 40-160 pixels, a swing frequency is 80-300 Hz, a focus is a negative focus, and the pressure is 5-25 bar when a cutting auxiliary gas is nitrogen or air;

when cutting a carbon steel medium plate or thick plate, a light spot track diameter is 10-80 pixels, a swing frequency is 100-200 Hz, a focus is a positive focus, and the pressure is 0.4-2.8 bar when the cutting auxiliary gas is oxygen; and when cutting a medium or thick plate of copper or aluminum, a light spot track diameter is 40-90 pixels, a swing frequency is 100-300 Hz, a focus is a negative focus, and the pressure is 5-25 bar when the cutting auxiliary gas is nitrogen or air.

11. The laser cutting light spot control system according to claim 2, characterized in that, the laser cutting light spot control apparatus comprises: a memory;

the memory stores therein light spot track parameters;

the main processor receives the light spot track parameters transmitted by the upper computer, compares the received light spot track parameters with the light spot track parameters stored in the memory, and judges whether they are identical or not;

if they are identical, the received light spot track parameters are not written into the memory, and the light spot track parameters stored in the memory are retrieved and configured into light spot track pattern data; and if they are not identical, the received light spot track parameters are written into the memory, and the received light spot track parameters are configured into light spot track pattern data.

12. The laser cutting light spot control system according to claim 11, characterized in that, when the upper computer sends a start-up control command to the main processor and the light spot track parameters are not attached, the main processor retrieves previous light spot track parameters from the memory and configures the previous light spot track parameters into light spot track pattern data to perform a cutting operation.

13. The laser cutting light spot control system according to claim 2, characterized in that, the laser cutting light spot control apparatus further comprises: an auxiliary chip; and the auxiliary chip is configured to monitor operation data of the laser cutting light spot control system, and when fault data of the laser cutting light spot control system is monitored, an alarm prompt is performed.

14. A laser cutting light spot control method, characterized in that, the method adopts the laser cutting light spot control system according to claim 11;

the method comprises:

acquiring light spot track parameters;

performing coordinate point fitting, by a graphic processing module, on the input light spot track parameters to form a minimum component unit of a light spot pattern, and then forming final light spot track pattern data by rotation, translation, replication, stretching operations based on the minimum component unit, and performing storage; and executing a cutting process by retrieving a cutting coordinate set from a storage module in a preset cutting sequence.

15. A laser cutting light spot control method, characterized in that, the method adopts the laser cutting light spot control system according to claim 12;

the method comprises:

acquiring light spot track parameters;

performing coordinate point fitting, by a graphic processing module, on the input light spot track parameters to form a minimum component unit of a light spot pattern, and then forming final light spot track pattern data by rotation, translation, replication, stretching operations based on the minimum component unit, and performing storage; and executing a cutting process by retrieving a cutting coordinate set from a storage module in a preset cutting sequence.

16. A laser cutting light spot control method, characterized in that, the method adopts the laser cutting light spot control system according to claim 13;

the method comprises:

acquiring light spot track parameters;

performing coordinate point fitting, by a graphic processing module, on the input light spot track parameters to form a minimum component unit of a light spot pattern, and then forming final light spot track pattern data by rotation, translation, replication, stretching operations based on the minimum component unit, and performing storage; and executing a cutting process by retrieving a cutting coordinate set from a storage module in a preset cutting sequence.

17. The laser cutting light spot control method according to claim 14, characterized in that, in the method, the graphic processing module performs coordinate point fitting according to the light spot track pattern data input by a user, calculates the minimum component unit forming the light spot pattern, and then forms first light spot track pattern data by rotation, translation, replication, stretching operations based on the minimum component unit;

the first light spot track pattern data comprises: an elliptical shape, or a figure-8 shape, or a semicircular shape, or an O-shape, or a ∞-shape; and when second light spot track pattern data is formed after the first light spot track pattern data is configured to be performed, an offset between a pattern center symmetric point corresponding to the first light spot track pattern data and a pattern center symmetric point corresponding to the second light spot track pattern data is displacement data of a pattern center symmetric point.

18. The laser cutting light spot control method according to claim 15, characterized in that, in the method, the graphic processing module performs coordinate point fitting according to the light spot track pattern data input by a user, calculates the minimum component unit forming the light spot pattern, and then forms first light spot track pattern data by rotation, translation, replication, stretching operations based on the minimum component unit;

the first light spot track pattern data comprises: an elliptical shape, or a figure-8 shape, or a semicircular shape, or an O-shape, or a ∞-shape; and when second light spot track pattern data is formed after the first light spot track pattern data is configured to be performed, an offset between a pattern center symmetric point corresponding to the first light spot track pattern data and a pattern center symmetric point corresponding to the second light spot track pattern data is displacement data of a pattern center symmetric point.

19. The laser cutting light spot control method according to claim 16, characterized in that, in the method, the graphic processing module performs coordinate point fitting according to the light spot track pattern data input by a user, calculates the minimum component unit forming the light spot pattern, and then forms first light spot track pattern data by rotation, translation, replication, stretching operations based on the minimum component unit;

the first light spot track pattern data comprises: an elliptical shape, or a figure-8 shape, or a semicircular shape, or an O-shape, or a ∞-shape; and when second light spot track pattern data is formed after the first light spot track pattern data is configured to be performed, an offset between a pattern center symmetric point corresponding to the first light spot track pattern data and a pattern center symmetric point corresponding to the second light spot track pattern data is displacement data of a pattern center symmetric point.

20. The laser cutting light spot control method according to claim 14, characterized by further comprising:

adjusting the displacement data of the pattern symmetric point therein so that the pattern symmetric point of the light spot pattern is coaxial with an air path, a nozzle and a center of a cavity;

retrieving the light spot track pattern data and setting a swing frequency or speed; and after configuration of the light spot track pattern data is completed, retrieving a cutting coordinate set by a main processor according to a preset sequence, sending the cutting coordinate set to a driving board so as to control a galvanometer motor inside a laser head to make the light spot to do continuous minute movement along a preset track, i.e., to implement the swing of the light spot, and generating a light spot track pattern to be projected on a cut material by guided light.

21. The laser cutting light spot control method according to claim 15, characterized by further comprising:

adjusting the displacement data of the pattern symmetric point therein so that the pattern symmetric point of the light spot pattern is coaxial with an air path, a nozzle and a center of a cavity;

retrieving the light spot track pattern data and setting a swing frequency or speed; and after configuration of the light spot track pattern data is completed, retrieving a cutting coordinate set by a main processor according to a preset sequence, sending the cutting coordinate set to a driving board so as to control a galvanometer motor inside a laser head to make the light spot to do continuous minute movement along a preset track, i.e., to implement the swing of the light spot, and generating a light spot track pattern to be projected on a cut material by guided light.

22. The laser cutting light spot control method according to claim 16, characterized by further comprising:

adjusting the displacement data of the pattern symmetric point therein so that the pattern symmetric point of the light spot pattern is coaxial with an air path, a nozzle and a center of a cavity;

retrieving the light spot track pattern data and setting a swing frequency or speed; and after configuration of the light spot track pattern data is completed, retrieving a cutting coordinate set by a main processor according to a preset sequence, sending the cutting coordinate set to a driving board so as to control a galvanometer motor inside a laser head to make the light spot to do continuous minute movement along a preset track, i.e., to implement the swing of the light spot, and generating a light spot track pattern to be projected on a cut material by guided light.

23. The laser cutting light spot control method according to claim 14, characterized in that the method further comprises:

controlling the laser head to fall at a preset falling speed, after the laser head hits the cut material for a first time, raising to a preset height and then falling again, and raising to a highest limit point until the laser head hits a plate for a second time, at which time an initial height position for the laser head being set;

controlling the laser head to move horizontally over a bezel of the cut material, and monitoring whether the laser head is able to move outside the cut material range by the guided light; and if the guided light does not move outside the bezel of the cut material, determining a cut range.

24. The laser cutting light spot control method according to claim 15, characterized in that the method further comprises:

controlling the laser head to fall at a preset falling speed, after the laser head hits the cut material for a first time, raising to a preset height and then falling again, and raising to a highest limit point until the laser head hits a plate for a second time, at which time an initial height position for the laser head being set;

controlling the laser head to move horizontally over a bezel of the cut material, and monitoring whether the laser head is able to move outside the cut material range by the guided light; and if the guided light does not move outside the bezel of the cut material, determining a cut range.

25. The laser cutting light spot control method according to claim 16, characterized in that the method further comprises:

controlling the laser head to fall at a preset falling speed, after the laser head hits the cut material for a first time, raising to a preset height and then falling again, and raising to a highest limit point until the laser head hits a plate for a second time, at which time an initial height position for the laser head being set;

controlling the laser head to move horizontally over a bezel of the cut material, and monitoring whether the laser head is able to move outside the cut material range by the guided light; and if the guided light does not move outside the bezel of the cut material, determining a cut range.

26. The laser cutting light spot control method according to claim 14, characterized in that, when cutting a stainless steel medium plate or thick plate, a light spot track diameter is 40-160 pixels, a swing frequency is 80-300 Hz, a focus is a negative focus, and the pressure is 5-25 bar when a cutting auxiliary gas is nitrogen or air;

when cutting a carbon steel medium plate or thick plate, a light spot track diameter is 10-80 pixels, a swing frequency is 100-200 Hz, a focus is a positive focus, and the pressure is 0.4-2.8 bar when the cutting auxiliary gas is oxygen; and when cutting a medium or thick plate of copper or aluminum, a light spot track diameter is 40-90 pixels, a swing frequency is 100-300 Hz, a focus is a negative focus, and the pressure is 5-25 bar when the cutting auxiliary gas is nitrogen or air.

27. The laser cutting light spot control method according to claim 15, characterized in that, when cutting a stainless steel medium plate or thick plate, a light spot track diameter is 40-160 pixels, a swing frequency is 80-300 Hz, a focus is a negative focus, and the pressure is 5-25 bar when a cutting auxiliary gas is nitrogen or air;

when cutting a carbon steel medium plate or thick plate, a light spot track diameter is 10-80 pixels, a swing frequency is 100-200 Hz, a focus is a positive focus, and the pressure is 0.4-2.8 bar when the cutting auxiliary gas is oxygen; and when cutting a medium or thick plate of copper or aluminum, a light spot track diameter is 40-90 pixels, a swing frequency is 100-300 Hz, a focus is a negative focus, and the pressure is 5-25 bar when the cutting auxiliary gas is nitrogen or air.

28. The laser cutting light spot control method according to claim 16, characterized in that, when cutting a stainless steel medium plate or thick plate, a light spot track diameter is 40-160 pixels, a swing frequency is 80-300 Hz, a focus is a negative focus, and the pressure is 5-25 bar when a cutting auxiliary gas is nitrogen or air;

when cutting a carbon steel medium plate or thick plate, a light spot track diameter is 10-80 pixels, a swing frequency is 100-200 Hz, a focus is a positive focus, and the pressure is 0.4-2.8 bar when the cutting auxiliary gas is oxygen; and when cutting a medium or thick plate of copper or aluminum, a light spot track diameter is 40-90 pixels, a swing frequency is 100-300 Hz, a focus is a negative focus, and the pressure is 5-25 bar when the cutting auxiliary gas is nitrogen or air.

29. The laser cutting light spot control method according to claim 16, characterized in that, the method further comprises, after the laser cutting light spot control apparatus is powered on, outputting first working state information and second working state information by the main processor;

outputting the first working state information to the auxiliary chip, and detecting the first working state information by the auxiliary chip in real time;

when the auxiliary chip detects that the first working state information is abnormal, sending out alarm information to the system; and when the auxiliary chip crashes, starting a watchdog set inside the auxiliary chip to perform reset restarting on the auxiliary chip to continue to detect the state of the main processor.

30. The laser cutting light spot control method according to claim 19, characterized in that, the method further comprises, after the laser cutting light spot control apparatus is powered on, outputting first working state information and second working state information by the main processor;

outputting the first working state information to the auxiliary chip, and detecting the first working state information by the auxiliary chip in real time;

when the auxiliary chip detects that the first working state information is abnormal, sending out alarm information to the system; and when the auxiliary chip crashes, starting a watchdog set inside the auxiliary chip to perform reset restarting on the auxiliary chip to continue to detect the state of the main processor.

31. The laser cutting light spot control method according to claim 22, characterized in that, the method further comprises, after the laser cutting light spot control apparatus is powered on, outputting first working state information and second working state information by the main processor;

outputting the first working state information to the auxiliary chip, and detecting the first working state information by the auxiliary chip in real time;

when the auxiliary chip detects that the first working state information is abnormal, sending out alarm information to the system; and when the auxiliary chip crashes, starting a watchdog set inside the auxiliary chip to perform reset restarting on the auxiliary chip to continue to detect the state of the main processor.

32. The laser cutting light spot control method according to claim 29, characterized in that, monitoring the second working state information as well as the auxiliary chip state information in real time, and when detecting that the second working state information or the auxiliary chip state information is abnormal, turning off lighting of the laser immediately, and simultaneously giving an alarm;

monitoring the state of the driving board in real time by the auxiliary chip, when the driving board fails or reports an error, outputting a driving board failure signal by the auxiliary chip; and detecting the temperature of the driving board by the auxiliary chip through a temperature sensor, and sending out an alarm signal indicating that the temperature exceeds a threshold when the temperature exceeds the threshold.

33. The laser cutting light spot control method according to claim 30, characterized in that, monitoring the second working state information as well as the auxiliary chip state information in real time, and when detecting that the second working state information or the auxiliary chip state information is abnormal, turning off lighting of the laser immediately, and simultaneously giving an alarm;

monitoring the state of the driving board in real time by the auxiliary chip, when the driving board fails or reports an error, outputting a driving board failure signal by the auxiliary chip; and detecting the temperature of the driving board by the auxiliary chip through a temperature sensor, and sending out an alarm signal indicating that the temperature exceeds a threshold when the temperature exceeds the threshold.

34. The laser cutting light spot control method according to claim 31, characterized in that, monitoring the second working state information as well as the auxiliary chip state information in real time, and when detecting that the second working state information or the auxiliary chip state information is abnormal, turning off lighting of the laser immediately, and simultaneously giving an alarm;

monitoring the state of the driving board in real time by the auxiliary chip, when the driving board fails or reports an error, outputting a driving board failure signal by the auxiliary chip; and detecting the temperature of the driving board by the auxiliary chip through a temperature sensor, and sending out an alarm signal indicating that the temperature exceeds a threshold when the temperature exceeds the threshold.

* * * * *